Patented July 27, 1954

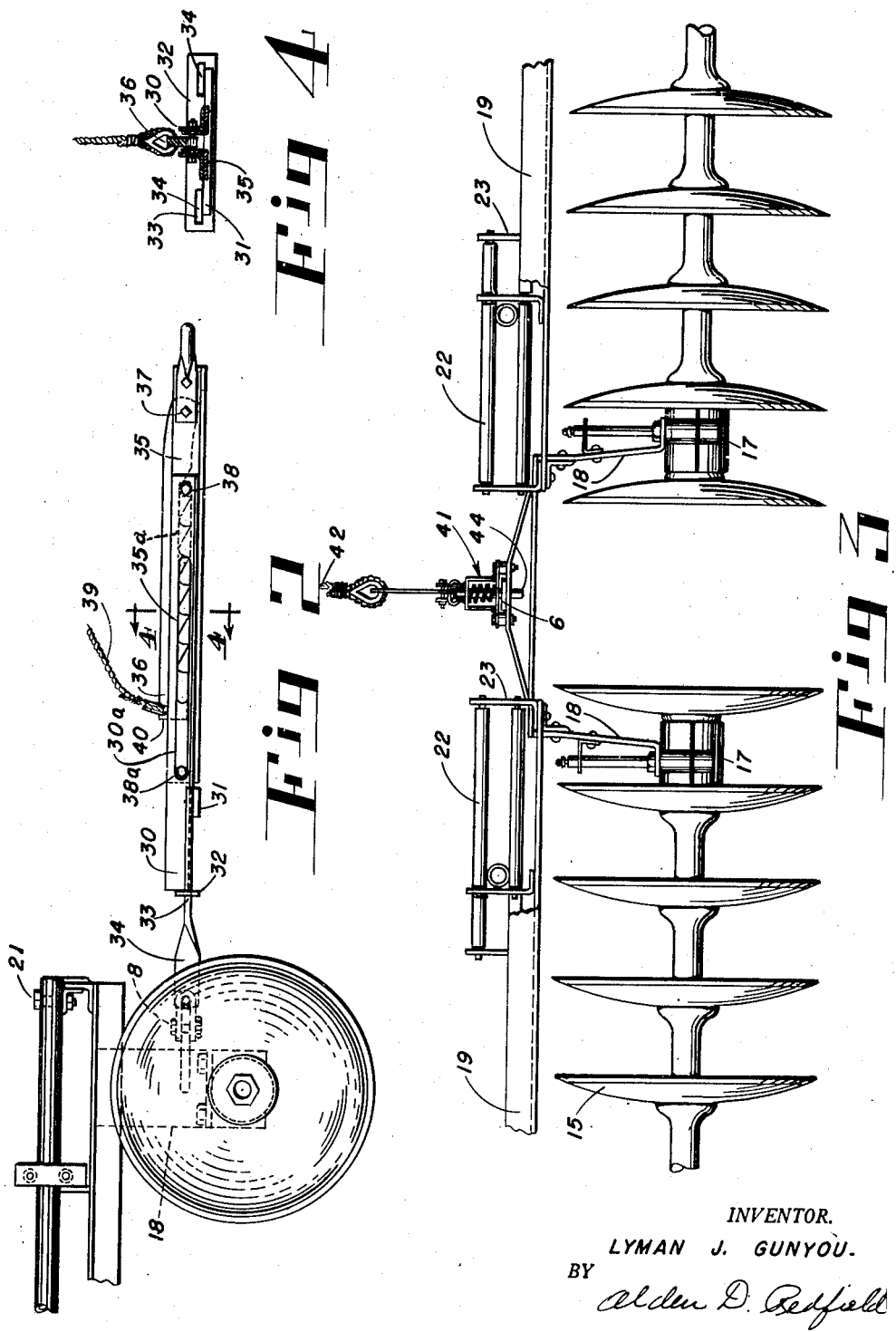

2,684,563

UNITED STATES PATENT OFFICE 2,684,563

DISK HARROW

Lyman John Gunyou, Celina, Ohio, assignor to Avco Manufacturing Corporation, Cincinnati, Ohio, a corporation of Delaware Application February 9, 1951, Serial No. 210,185

7 Claims. (Cl. 55—83)

The present invention relates to an improved form of four-gang disc harrow and has particular reference to a harrow which, although simple in arrangement, is extremely effective in maintaining the gang assemblies substantially horizontal at all times.

The present invention comprehends a four-gang disc harrow having two forward gang assemblies and two rear gang assemblies in tandem relationship. The various gang assemblies are structurally interconnected to make possible either simultaneous angling of all four gangs or independent angling of either the forward or rear gangs in pairs. An important feature of the preferred embodiment is that the gangs are maintained substantially horizontal during all conditions of use despite the fact that the harrow does not incorporate a rigid framework.

Harrows are usually constructed with either an overall rigid framework to maintain the gangs in their respective positions or with partial frameworks for maintaining the relative positions of pairs of gangs. Such frameworks often are expensive to manufacture and may necessitate special forming tools.

In contrast, all of the elements of a harrow made according to the present invention can be easily fabricated from standard, readily available structure forms. The relative positions of the gangs are maintained by a latticework of interacting structural members, and since no rigid framework is involved, practically every part of the harrow can be assembled without the aid of jigs or fixtures.

Thus a particular object of the present invention is the provision of a harrow which employs a latticework of structural elements instead of a framework and which is very economical to manufacture.

Another advantage of the present invention is that it incorporates very simple structural forms which can be easily replaced when worn without riveting or other fabricating operations which cannot be easily performed on a farm.

It is also an object of the present invention to provide a harrow which although extremely simple and easy to construct is very effective in operation. Another advantage of the present invention is to provide a four-gang harrow, the gangs of which may be simultaneously angled or individually angled in pairs, to permit different farming operations.

Another advantage of the invention is that it makes possible simultaneous or individual angling of the gangs by the simple manipulation of ropes attached to the tractor or other draft means. In other words, by use of the present invention all common types of angling can be obtained by the operator of the tractor while he remains seated thereon.

Another advantage of the present invention is that it incorporates a draft hitch which may be easily raised and lowered for attachment to tractor draw bars of various heights.

A still further advantage is that the relative horizontal positions of the gangs can be maintained with a minimum of adjustment.

The novel features that are considered characteristic of the invention are set forth in the appended claims; the invention itself, however, both as to its organization and method of operation, together with additional objects and advantages thereof, will best be understood from the following description of a preferred embodiment when read in conjunction with the accompanying drawings in which:

Fig. 2 is a side elevational view of the forward portion of the harrow showing the relative position of an extensible draft hitch and the forward gangs;

Fig. 3 is a front elevational view taken on plane 3—3 of Fig. 1, showing the structure at the inner ends of the rear gangs for maintaining their relative positions during harrowing operations, and Fig. 4 is a cross-sectional view taken on plane 4—4 of Fig. 2 showing certain structural details of the extensible draft hitch.

Structural arrangement

Figure 1:
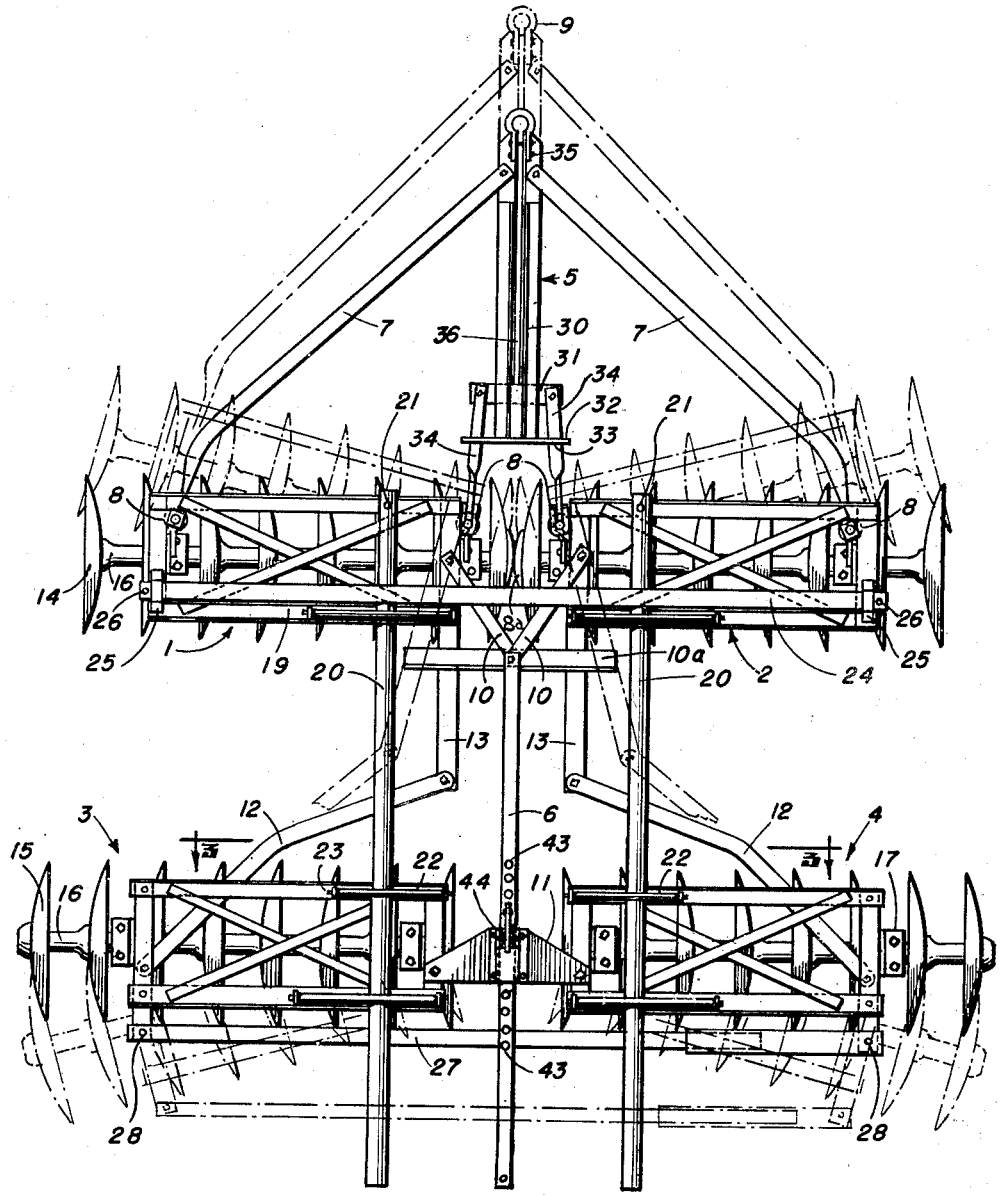
Fig. 1 is a top plan view of a harrow made according to the present invention, the figure showing in full lines a parallel disposition of the gang assemblies and showing in phantom lines the relative positions assumed by the gangs when simultaneously angled.

As shown particularly well in Fig. 1 the preferred embodiment of the present invention incorporates four gang assemblies, generally designated 1 through 4, respectively, in tandem relationship. It will be noted that gang assemblies 1 and 2 are positioned forwardly of rear gang assemblies 3 and 4. Forward motion, imparted to the gang assemblies through an extensible draft hitch, generally designated 5, is transferred to the rear gang assemblies partially through a draft bar 6. A pair of tension members 7 are pivotally attached at their forward ends to the forward end of draft hitch 5 and are pivotally attached at their rear ends to the outer ends of the forward gangs 1 and 2. It is important to note that tension members 7, as well as draft hitch 5, are pivotally attached, as at 8, for vertical swinging movement so that eye 9 may be easily raised and lowered for ready attachment to the draw bar (not shown) of a tractor or other draft means.

Draft bar 6 is pivotally attached at its forward end to anchor straps 10 which are pivotally attached in turn at their forward ends to the inner ends of gang assemblies 1 and 2. A saddle 11 is adjustable secured to the rear of draft bar 6 and extends transversely of the draft bar for pivotal attachment with the inner ends of rear gangs 3 and 4. The outer ends of these gangs are pivotally connected through links 12 to rearwardly extending arms 13, rigidly attached to the inner ends of the forward gangs 1 and 2. A transverse support 10a, extending between arms 13, prevents the forward end of the draft bar from sagging.

The pull of the draft means is transferred from eye 9 through draft hitch 5 and tension members 7 to the inner and outer ends, respectively, of the forward gangs. Draft forces are applied to the inner ends and outer ends of the rear gangs through draft bar 6 and links 12.

The preferred embodiment of the present invention incorporates conventional inwardly and outwardly facing discs. For instance, the forward gangs have out-throw discs, such as indicated at 14, whereas the rear gangs have in-throw discs, indicated at 15. Each gang assembly comprises a plurality of discs joined together by a central through-bolt (not shown) and held in spaced relationship by spacing spools 16. As indicated in Fig. 3, each gang assembly is provided with a pair of bearings 17, each rigidly secured to a bearing hanger 18 depending from a framework 19. Each group of discs rotates as an assembly as is well known in the art; since the present invention does not relate to this feature no further details will be described.

It is common knowledge that disc harrows may be used to advantage both in parallel and angled positions. In the parallel position, commonly employed during transportation of the harrow, all the gangs are disposed in parallel, outspread relationship as indicated by full lines in Fig. 1. When angled, the disc gangs are positioned angularly with respect to one another as indicated in phantom lines. Probably the most common mode of operation is with all four gangs angled simultaneously as shown. When operated in this fashion the forward gang assemblies tend to displace dirt outwardly relative to the center of the harrow whereas the rear gang assemblies tend to displace dirt inwardly, the net effect being that little, if any, net displacement of dirt occurs; and the ground behind the harrow is left substantially level.

The forward gangs, when angled, produce a thrust towards the center line of the harrow which is mutually transferred from one gang to the other through bumpers 8a. The pull of the rear gangs away from the center of the harrow incidental to angled operation is counterbalanced through saddle 11.

Latticework to position gangs

It will be appreciated by those versed in the art that a gang assembly of the type described has a marked tendency in use to heave or lift at one end when angled due to the reactive forces caused by engagement of the discs with the ground. Accordingly, the forward gangs tend to lift at their inner ends whereas the rear gangs tend to lift at their outer ends. This tendency to heave or lift is often termed "upthrust" and must be counteracted if the harrow is to operate satisfactorily and leave the ground substantially level after its passage. It has been found from actual tests that a harrow constructed according to the teachings of the present invention effectively opposes any tendency of the disc gangs to heave. The apparatus to prevent such heaving of the gangs will now be described.

A pair of rigid longitudinals 20 are pivotally attached at their forward ends, as at 21, to the framework of the forward gang assemblies. These longitudinals are parallel to draft bar 6 and extend rearwardly over the rear gang assemblies 3 and 4. Each longitudinal is engaged above and below by roller supports 22 which are rotatably supported by brackets 23 secured to and projected upwardly from the frameworks of the rear gangs. These supports permit movement of longitudinals 20 in a horizontal plane as the gang assemblies are angled while maintaining the rear gang assemblies in upright positions.

A transverse 24 is slideably engaged with the outer end of each forward gang by anchor members 25 which project upwardly from the rigid frameworks 19. Pins 26 are provided at the outer ends of the transverse to prevent disengagement from anchor members 25.

A telescopic transverse 27 is pivotally attached at the outer rear corners 28 of the rear gangs as indicated in Fig. 1. Transverse 27 is composed of telescopic tubular members which are laterally extensible to accommodate angling movements of the rear gangs. It is important to note that transverse 24 passes over longitudinals 20 while transverse 27 passes underneath longitudinals 20 and draft bar 6. As the inner ends of the forward gangs tend to lift in the course of harrowing operations, transverse 24, engaged with anchored members 25, is brought into engagement with the top surfaces of longitudinals 20. Heaving of the gang assemblies is thus effectively opposed by bending stresses created in the transverse.

As the outer ends of the rear gangs tend to lift, transverse 27 is forced against the bottom surfaces of longitudinals 20 and bending stresses are created in the transverse which effectively oppose the heaving tendency.

Both of the transverse members 24 and 27, as well as longitudinals 20, may be made from standard structure forms such as pipe, channel or angle iron and it will be appreciated by those skilled in the art that the construction disclosed may be readily fabricated without extensive tooling and that, despite its simplicity, a structure is provided which effectively opposes the tendency of the gangs to heave while in operation.

Simultaneous and independent angling

Simultaneous angling of all four gangs is accomplished in the present embodiment through the provision of longitudinally extensible draft hitch 5 which includes a pair of longitudinal angle irons 30 attached at their rear ends to cross plate 31 and guide plate 32. The guide plate is apertured, as at 33, to permit the passage of pull bars 34 pivotally secured at their forward ends to cross plate 31 and at their rear ends to the inner ends of the forward gangs at 8. Nested within angle irons 30 is a second pair of longitudinally movable angle irons 35 (see Fig. 4). The tension members 7 are pivotally secured at their forward ends to these latter angle irons. Draft forces imparted to the eye 9 are transferred through angle irons 35 to angle irons 30 and cross plate 31 from which the forces are transferred to the pull bars 34.

With specific reference to Figs. 2 and 4, it will be noted that a ratchet bar 36, pivotally secured, as at 37, to the forward end of angle irons 35, engages transverse bolt 38 which is secured to the forward ends of angle irons 30. When end 40 of the ratchet bar is raised by a pull on rope 39 to permit disengagement with bolt 38, the angle irons 30 and 35 may be moved longitudinally relative to one another to effect a change of length of draft hitch 5. Lowering end 40 of the ratchet bar causes reengagement with bolt 38 and prevents further lengthening of the draft hitch. Angle irons 35 are slotted at 35a to permit movement of bolt 38. A second bolt 38a is secured to the rear ends of angle irons 35 and slideably engages slots 30a in angle irons 39 to hold the nested angle irons in assembled relationship.

It will be understood by those skilled in the art that as draft hitch 5 extends longitudinally, the outer ends of the forward gangs are drawn forwardly relative to the inner ends and thus the forward gang assemblies are moved into the angled position.

As the forward gang assemblies are angled, arms 13 rotate correspondingly and transfer motion through links 12 to the outer ends of the rear gang assemblies which move rearwardly relative to the inner ends to the angled position indicated in phantom lines in Fig. 1. During this movement the inner ends remain relatively fixed by virtue of the substantially stationary position of saddle 11 to which the inner ends are attached. A slight movement is imparted to draft bar 6 by the movement of the inner ends of the forward gangs; however, this movement is negligible and does not impair the simultaneous angling of the rear gangs.

Thus, in order to simultaneously angle all four gangs, it is merely necessary for the operator to release ratchet bar 36 and to pull the harrow forward. The harrow is taken out of angle (deangling) by forcing it rearwardly which causes the draft hitch to decrease in length and the gang assemblies to correspondingly rotate to their parallel positions. It should be appreciated that angling and deangling of the gangs is accomplished with the aid of the reactive forces set up by the dirt engaging the individual discs during their movement.

Occasionally a farmer requires displacement of dirt away from or towards a given line. A harrow constructed according to the present invention can be used at such times and may be adjusted to shift dirt either towards or away from the center line of its path of travel. In order to accomplish such results the forward or rear gang assemblies are angled independently in pairs.

It is to be noted that when the gangs are simultaneously angled, saddle 11 remains fixed relative to draft bar 6 in a position which may be termed a "neutral position." The saddle is maintained in this relative position by a releasable latch mechanism, generally designated 41, having a control rope 42 which is under the control of the tractor operator. A plurality of holes 43 is provided in the draft bar 6 for engagement with spring loaded latch member 44 which passes through saddle 11. Latch 44 may engage any one of the holes 43 provided in the draft bar, making possible adjustment of the saddle on the draft bar.

Should it be desired to angle merely the forward gangs this can be simply accomplished by first angling all four gangs simultaneously as has been described. Thereafter latch 44 is withdrawn from its neutral position relative to draft bar 6. Forward motion of the harrow thereafter permits saddle 11 to slide rearwardly along the draft bar and the inner ends of the rear gangs to move correspondingly rearwardly until the rear gangs are again in a parallel transverse position. When this position has been attained, rope 42 is released and latch 44 drops into one of the holes 43 to lock the saddle in place.

In practice the operator usually disengages latch 44 from the neutral position simultaneously with the release of ratchet bar 36 so that the individual angling of the forward gangs can be accomplished in one operation rather than two as described hereinbefore.

By use of the present invention it is also possible to angle the rear pair of gangs independently of the forward gangs. This may be accomplished in practice by merely releasing latch 44 from the neutral position on draft bar 6 while simultaneously forcing the harrow rearwardly. Such movement causes saddle 11 to slide forwardly relative to draft bar 6 and forces the rear gang assemblies into angled position while the forward gang assemblies remain substantially parallel. The forward gangs cannot depart from the parallel position by virtue of the fact that angle irons 35 butt at their rear ends against cross plate 31 and prevent any further decrease in length of draft hitch 5.

By virtue of the independent angling attainable with the presently disclosed harrow, it is possible for a farmer to accomplish a net transfer of dirt away from the center of his path of travel by merely angling the forward gangs while holding the rear gangs parallel. Similarly, a net transfer of dirt toward the center line of travel can be accomplished by angling the rear gangs while holding the forward gangs parallel.

It will be apparent from the foregoing description that the present invention comprehends a harrow which is composed of very simple structural members and does not employ any rigid framework to maintain the gang assemblies in their operative relationship. It will also be appreciated that a harrow of the preferred type can be used with the gangs either simultaneously or independently angled as has been described.

Having described a preferred embodiment of my invention, I claim:

1. In a four-gang disc harrow a pair of laterally spaced forward gangs, a pair of laterally spaced rear gangs disposed in tandem relationship with said forward gangs, a draft hitch movably secured to said forward gangs, a draft bar pivotally connected to the inner ends of said forward and rear gangs, a plurality of longitudinally extending rigid structural members swingably attached to said forward gangs and slideably engaging said rear gangs, a transverse laterally rigid structural member inter-connecting the outer ends of said forward gangs, a transverse laterally rigid structural member inter-connecting the outer ends of said rear gangs, said longitudinally and transversely disposed structural members slidably bearing against each other and forming a lattice work for resisting upthrust of said gangs, the inter-connections between said transverse structural members and their associated gangs providing lateral movement of the gangs relative to their transverse structural member.

2. In a tandem four-gang disc harrow a pair of laterally out-spread forward gang assemblies, a pair of laterally outspread rear gang assemblies behind said forward assemblies and in tandem relationship therewith, a draft hitch movably secured to said forward gang assemblies, a draft bar secured to said forward gang assemblies, a saddle secured to said draft bar between the inner ends of said rear gang assemblies, said rear gang assemblies being pivotally secured to said saddle, a pair of rigid longitudinal members pivotally secured at their forward ends to said forrear gang assemblies, a rigid transverse member slidably engaged with the outer ends of said forward gang assemblies, said transverse member passing over said longitudinal members, a rigid telescopic member pivotally secured to the outer ends of said rear gang assemblies, said telescopic member passing underneath said longitudinal members.

3. A tandem four-gang disc harrow comprising a pair of forward gang assemblies, a pair of rear gang assemblies behind said forward gang assemblies and in tandem relationship therewith, an extensible draft hitch movably secured to the inner ends of said forward gangs, a pair of tension members pivotally secured at their forward ends to said draft hitch and pivotally secured at their rear ends to the outer ends of said front gang assemblies, a draft bar pivotally secured to said forward gang assemblies and extending rearwardly between the inner ends of said rear gang assemblies, means for pivotally securing the inner ends of said rear gang assemblies to said draft bar, a plurality of rigid longitudinals pivotally attached at the forward ends to said gang assemblies and slideably engaging said rear gang assemblies, a rigid transverse member slidably engaged with said forward gang assemblies and passing over said longitudinals, a rigid transverse telescopic member engaged with said rear gang assemblies and passing beneath said longitudinal members, and means inter-connecting the inner ends of said forward gang assemblies with the outer ends of said rear gang assemblies whereby extension of said draft hitch imparts angling movement simultaneously to all four gang assemblies.

4. A four-gang disc harrow for use either with all four gangs angled simultaneously or for use with pairs of gangs angled independently comprising a pair of laterally outspread forward gang assemblies, a pair of laterally outspread rear gang assemblies, an extensible draft hitch movably secured to the inner ends of said forward gang assemblies, tension means inter-connecting the forward end of said draft hitch with the outer ends of said forward gang assemblies, a rearwardly extending draft bar pivotally connected at its forward end to the inner ends of said forward gang assemblies, a transverse saddle adjustably secured to said draft bar, the inner ends of said rear gang assemblies being pivotally secured to said saddle, a longitudinal member engaged with each of said forward gang assemblies and slideably engaging the rear gang assembly immediately behind it, a rigid transverse member slideably engaged with said forward gang assemblies and disposed above said longitudinal members, a rigid transverse member engaging said rear gang assemblies and passing beneath said longitudinal members, the engagement of said transverse member and said rear gang assemblies providing relative movement therebetween, a linkage system inter-connecting the inner end of each forward gang assembly with the outer end of each rear gang assembly immediately behind it, said extensible draft hitch being longitudinally adjustable to effect simultaneous angling of all four gang assemblies, said saddle being longitudinally adjustable on said draft bar to effect in conjunction with said draft hitch independent angling of said forward or rear gang assemblies in pairs.

5. In a tandem four-gang disc harrow a pair of laterally outspread forward gang assemblies, a pair of laterally outspread rear gang assemblies behind said forward assemblies and in tandem relationship therewith, a draft hitch movably secured to said forward gang assemblies, a draft bar inter-connecting said forward gang assemblies and said rear gang assemblies, a plurality of rigid longitudinal members pivotally secured at their forward ends to said forward gang assemblies and slideably engaging said rear gang assemblies, a rigid transverse member slideably engaged with the outer ends of said said forward gang assemblies and bearing against the top of said longitudinals, and a rigid transverse telescopic member connected to the outer ends of said rear gang assemblies and bearing against the bottom of said longitudinal members.

6. A tandem four-gang disc harrow comprising a draft hitch, a pair of laterally outspread forward gang assemblies, said draft hitch being movably secured to said forward gang assemblies a pair of laterally outspread rear gang assemblies in tandem relationship with said forward assemblies, draft means interconnecting said forward and said rear gang assemblies, rigid longitudinal members connected to said forward gang assemblies and slidably engaged with said rear gang assemblies, a rigid transverse member interconnecting said forward assemblies and slidably bearing against said longitudinal members, and a rigid transverse member interconnecting said rear gang assemblies and slidably bearing against said longitudinal members, the inter-connections between said rigid transverse members and the associated gang assemblies providing lateral movement of the assemblies relative to their associated transverse member.

7. A tandem four-gang disc harrow comprising a draft hitch, a pair of laterally outspread forward gang assemblies movably secured to said draft hitch, a pair of laterally outspread rear gang assemblies in tandem relationship with said forward assemblies, draft means inter-connecting said forward and said rear gang assemblies, a pair of longitudinal members slidably inter-connecting said forward and said rear gang assemblies, a rigid transverse member movably inter-connecting said forward assemblies and slidably bearing against said longitudinal members, and a rigid transverse member movably inter-connecting said rear gang assemblies and slidably bearing against said longitudinal members.

References Cited in the file of this patent

UNITED STATES PATENTS

| Number | Name | Date |
| --- | --- | --- |
| 1,421,047 | Ward | June 27, 1922 |
| 2,163,818 | White | June 27, 1939 |
| 2,171,768 | Sjogren et al. | Sept. 5, 1939 |
| 2,339,124 | White | Jan. 11, 1944 |
| 2,584,238 | Sonneman | Feb. 5, 1952 |